United States Patent
Eckert et al.

(10) Patent No.: US 6,934,618 B2
(45) Date of Patent: Aug. 23, 2005

(54) SYSTEM AND METHOD FOR MONITORING BRAKE OVERLOAD IN ELECTRONICALLY-CONTROLLED BRAKE SYSTEMS OF VEHICLES AND VEHICLE COMBINATIONS

(75) Inventors: Horst Eckert, Rehburg-Loccum (DE); Arnd Gaulke, Ronnenberg (DE)

(73) Assignee: Wabco GmbH & Co. oHG, Hannover (DE)

( * ) Notice: Subject to any disclaimer, the term of this patent is extended or adjusted under 35 U.S.C. 154(b) by 300 days.

(21) Appl. No.: 10/426,889

(22) Filed: Apr. 29, 2003

(65) Prior Publication Data

US 2004/0015283 A1 Jan. 22, 2004

(30) Foreign Application Priority Data

Apr. 29, 2002 (DE) .......................................... 102 19 039

(51) Int. Cl.$^7$ ........................... B60T 13/74; G06F 19/00
(52) U.S. Cl. ............................. 701/70; 303/7; 303/128; 303/3; 701/19
(58) Field of Search ........................ 701/70, 19; 303/7, 303/128, 3

(56) References Cited

U.S. PATENT DOCUMENTS

| | | | |
|---|---|---|---|
| 4,674,326 A | | 6/1987 | Reinecke |
| 4,685,745 A | | 8/1987 | Reinecke |
| 4,790,606 A | | 12/1988 | Reinecke |
| 5,657,829 A | * | 8/1997 | May .............................. 180/197 |
| 6,099,085 A | * | 8/2000 | Eckert ............................. 303/3 |
| 6,109,702 A | * | 8/2000 | Horn et al. ..................... 303/7 |
| 2004/0041464 A1 | * | 3/2004 | Eckert et al. ................... 303/7 |

FOREIGN PATENT DOCUMENTS

| | | |
|---|---|---|
| DE | 40 07 360 A1 | 9/1991 |
| DE | 40 20 693 A1 | 2/1992 |
| DE | 42 08 581 A1 | 5/1993 |
| DE | 41 42 670 A1 | 6/1993 |
| DE | 42 24 971 A1 | 2/1994 |
| DE | 44 18 768 A | 12/1995 |
| DE | 195 28 553 A1 | 2/1996 |
| DE | 197 13 561 C1 | 5/1998 |
| DE | 197 07 207 A1 | 8/1998 |
| DE | 197 26 116 A1 | 1/1999 |
| DE | 199 33 961 A1 | 9/2000 |
| DE | 100 12 448 A1 | 10/2001 |
| DE | 101 06 374 A1 | 9/2002 |
| EP | 0 188 685 B1 | 7/1986 |
| EP | 0 189 082 A2 | 7/1986 |
| EP | 0 247 253 A | 12/1987 |
| EP | 0 288 846 A2 | 11/1988 |
| EP | 0 320 602 B1 | 6/1989 |
| EP | 0 417 431 B1 | 3/1991 |
| EP | 0 421 066 A | 4/1991 |
| EP | 0 569 697 B1 | 11/1993 |
| EP | 0 569 698 B1 | 11/1993 |

\* cited by examiner

Primary Examiner—Thomas G. Black
Assistant Examiner—Ronnie Mancho
(74) Attorney, Agent, or Firm—Kramer Levin Naftalis & Frankel LLP

(57) ABSTRACT

A system and method for overload monitoring of vehicle brakes of electronically controlled brake systems of vehicles and of vehicle combinations. The temperatures of the wheel brakes of the vehicle or vehicle train parts of the vehicle combination are determined and compared with a preset temperature limit value, and a first warning signal is output to the driver if the temperature of the wheel brakes on one axle of the vehicle or of a vehicle train part reaches the temperature limit value. A second warning signal is output to the driver if the determined temperatures of the wheel brakes on more than one axle of the vehicle or of at least one vehicle train part or all vehicle train parts of the vehicle combination reach the temperature limit value.

84 Claims, 4 Drawing Sheets

SYSTEM AND METHOD FOR MONITORING BRAKE OVERLOAD IN ELECTRONICALLY-CONTROLLED BRAKE SYSTEMS OF VEHICLES AND VEHICLE COMBINATIONS

BACKGROUND OF THE INVENTION

The present invention is directed generally to a system and method for monitoring brakes of electronically controlled brake systems ("EBSs") of vehicles and tractor and trailer vehicle combinations for overload.

A conventional EBS is designed to control brake lining wear and the adhesion relationship (that is, the coefficient of friction) between the vehicle wheels and the road surface. This is accomplished conventionally by controlling brake lining wear in the light braking range and adhesion in the heavy braking range.

When a vehicle driver depresses the brake pedal, the output brake actuation energy, in an initial range up to a presettable driver's set brake signal, is calculated solely according to criteria for controlling brake lining wear. In this initial range, axle loads are not considered. If the driver's set brake signal is reached, the control system switches from the light braking (brake lining wear) control range to the heavy braking (adhesion) control range. In the heavy braking range, comfort and safety aspects outweigh brake lining wear considerations.

The control objective in the heavy braking adhesion control range is equal adhesion—to achieve equal slip during braking for all vehicle wheels with no differential slip between vehicle axles. Axle loads are taken into consideration for calculation and control of brake actuation energy as the kinetic energy to be converted in the brakes is no longer equal from one axle to another. If set differential slip thresholds are reached before the driver's set brake signal is reached, the switch from the light braking brake lining wear control range to the heavy braking adhesion control range is triggered.

When, for example, a bus full of passengers is traveling downhill, the bus driver typically has to brake frequently, with the result that brake temperatures increase relatively quickly. As the brakes becomes hotter, the coefficient of friction ($\mu$) of the friction pair of the brake (brake lining/brake disk or brake lining/brake drum) decreases, sometimes by as much as 100%. A decrease in the coefficient of friction of the friction pair translates into poorer braking power.

If the brakes of the vehicle's front and rear axles heat to different temperatures, as is usually the case, the reduction of braking power is greatest where the temperature is highest. Under such conditions, the differential slip deviates from normal. Such a differential slip is compensated for by the EBS—the control objective of which is a differential slip of zero.

In commercial motor vehicles, especially trucks or buses, the cooling conditions for rear axle brakes are typically poorer than those for front axle brakes. Moreover, rear axle loads are routinely about 50 to 100% greater than front axle loads. This means that the rear axle brakes become hotter than the front axle brakes—and this can occur even in the light braking brake lining wear control range.

Since the rear axle brakes are hotter than the front axle brakes, they generate less braking power at the same brake actuation energy. By virtue of the zero differential slip control objective of the EBS, more brake actuation energy is introduced into the rear axle brakes under EBS control. As a result, the rear axle brakes become even hotter, presenting a possible overheating situation and associated undesired reduction in braking power.

In tractor and trailer vehicle combinations ("vehicle trains"), it is known to superpose coupling force control on the electronic control of brake actuation energy in order to control the set pressure of the trailer vehicle train part. The objective of such coupling force control is a coupling force of zero, so that no force at all or only a force of permissible magnitude (set magnitude) is transmitted via the trailer coupling from the trailer vehicle train part to the tractor vehicle train part, or vice-versa, during braking. In this way, it is possible to prevent jackknifing of the vehicle train due to an undesired pushing effect by the trailer vehicle train part, and thus improve the directional stability of the vehicle train. Moreover, it is also possible to prevent an undesired pulling effect by the tractor vehicle train part during braking.

If the wheel brakes of the tractor and trailer vehicle train parts develop different wheel brake temperatures, e.g., due to different distribution of load between the tractor vehicle train part and the trailer vehicle train part, the braking power of the wheel brakes having higher temperatures will be less than the braking power of the wheel brakes having lower temperatures at the same brake actuation energy, and undesired pushing by the trailer vehicle train part or pulling by the tractor vehicle train part can develop. If the rear axle of the tractor vehicle train part is more heavily loaded, its wheel brakes become hotter than the wheel brakes of the trailer vehicle train part; and if the axles of the trailer vehicle train part are more heavily loaded, the wheel brakes of the trailer vehicle train part become hotter than the wheel brakes of the tractor vehicle train part. Hotter tractor vehicle train part brakes translates into pulling, and hotter trailer vehicle train part brakes translates into pushing. A possible overheating situation and undesired reduction in braking power can be presented if the brake temperatures reach a presettable, defined limit value.

EP 0 188 685 B1 describes a brake overload protection and/or overload warning device whereby an actual brake pressure is compared with a set brake pressure. If the actual brake pressure differs from the set brake pressure by a preset value, a warning signal is transmitted. This device relates to an individual brake.

EP 0 320 602 B1 describes an overload warning device for a trailer brake. Both the brake pressure in the tractor vehicle and the brake pressure in the trailer vehicle are measured. The ratio of the two pressures is formed in a comparator device. A warning signal is transmitted if the rate of change of the ratio becomes equal to or larger than a preset threshold value.

EP 0 417 431 B1 describes a method for monitoring a brake device for overload. The method relates to an individual drum brake. The deformation of a selected component (brake drum) is measured and compared with a stored deformation characteristic. If the actual deformation occurring during a braking process is equal to or larger than the stored deformation, a warning signal is transmitted.

EP 0 569 697 B1 describes a method for monitoring a trailer brake of a vehicle train for overload. The electronic brake system is equipped with continuous coupling force control. During braking, an energy demand signal is generated in the tractor vehicle. The generated energy demand signal contributes to determination of the energy supply to the tractor vehicle brake, and from this signal, a trailer energy signal is derived that contributes to actuation of the trailer vehicle brake, the coupling force developed in the coupling being controlled by means of the trailer energy signal. An overload condition is recognized and a warning signal is transmitted if the trailer energy signal exhibits, at a given energy demand signal, an increase that is not merely transient.

EP 0 569 698 B1 discloses a method for monitoring a tractor brake of a vehicle train for overload. As in EP 0 569 697 B1, the trailer energy signal is monitored, the only difference in this case being that an overload condition of the tractor vehicle brake is recognized and then a corresponding warning signal is transmitted if, as the result of coupling force control adjustments, the trailer energy signal exhibits, at a given energy demand signal, a decrease that is not merely transient.

In each of the foregoing known methods, physical variables such as pressure, force and torque are evaluated in a comparison process. If it is found during comparison that predefined limit values are exceeded, a warning is delivered to the vehicle driver, who must modify further driving actions appropriately to protect against further overload.

Accordingly, it is desired to provide a system and method for monitoring brakes of EBSs of vehicles and vehicle combinations for temperature induced overload, and for warning the vehicle driver of an overload condition.

SUMMARY OF THE INVENTION

Generally speaking, in accordance with the present invention, a system and method for monitoring brakes of EBSs of vehicles and vehicle trains for temperature induced overload, and for warning the vehicle driver of an overload condition are provided.

According to a preferred embodiment of the system and method of the present invention, the temperatures of the wheel brakes of the vehicle (or the tractor and trailer vehicle train parts of a vehicle train) are ascertained, and the temperatures are compared against a preset temperature limit value. A first warning signal ("level 1 warning") is output to the vehicle driver if the temperature of the wheel brakes on one axle of the vehicle (or a vehicle train part) reaches the temperature limit value. A second warning signal ("level 2 warning") is output if the temperatures of the wheel brakes on more than one axle of the vehicle (or at least one vehicle train part or all vehicle train parts) reach the temperature limit value. Thus, for a vehicle or vehicle train, in addition to possible conventional coupling force control, a level 1 warning is generated if a defined high temperature (i.e., equaling or exceeding the preset limit value) of one wheel brake or a defined high mean temperature value of one axle develops during braking; and a level 2 warning is generated if defined high temperatures develop on more than one axle. A level 2 warning is also output if undesirably high wheel brake temperatures are developed on both or all vehicle train parts of a vehicle combination.

Warning signals can be generated, for example, by brake pedal feel and/or by a visual and/or audible indicator.

Accordingly, it is an object of the present invention to provide a system and method for monitoring brakes of EBSs of vehicles and vehicle combinations for overload which improves over prior art systems and methods.

It is a further object of the present invention to provide a system and method for warning a driver of a vehicle or vehicle combination of various temperature-induced brake overload conditions.

Still other objects and advantages of the present invention will in part be obvious and will in part be apparent from the specification.

The present invention accordingly comprises the various steps and the relation of one or more of such steps with respect to each of the others, and embodies features of construction, combinations or elements, and arrangement of parts which are adapted to effect such steps, all as exemplified in the following detailed disclosure, and the scope of the invention will be indicated in the claims.

BRIEF DESCRIPTION OF THE DRAWINGS

For a fuller understanding of the invention, reference is had to the following description taken in connection with the accompanying drawing in which.

DETAILED DESCRIPTION OF THE PREFERRED EMBODIMENTS

The term "brake actuation energy" as used herein is to be understood as encompassing all physical variables that cause a vehicle or vehicle train wheel brake supplied therewith to generate braking power. Examples of brake actuation energy are electrical variables such as current and voltage, or mechanical variables such as pressure. In the case of pressure as the brake actuation energy, pressurized liquids or gases, such as compressed air, can be used as the energy carrier.

Figure 1:
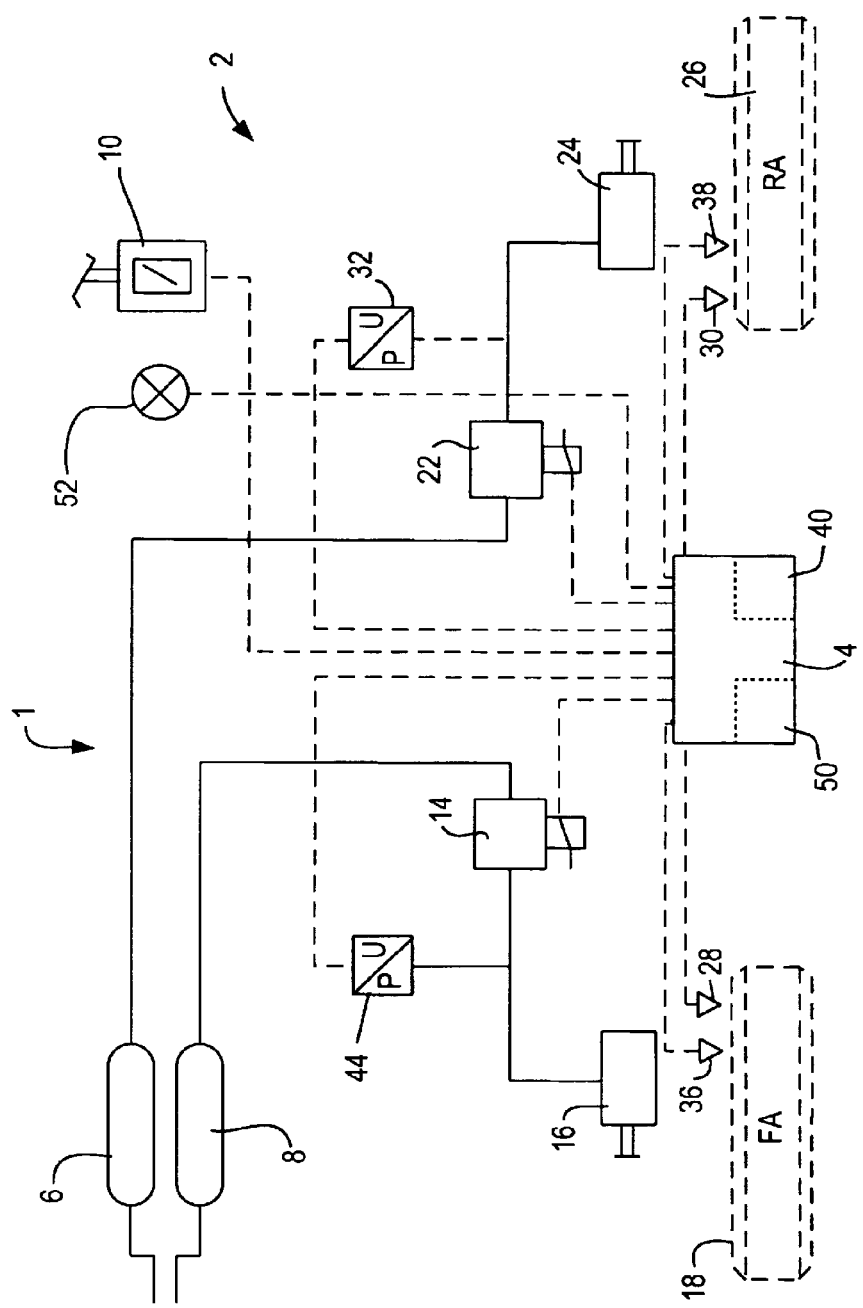
FIG. 1 is a schematic diagram depicting EBS control electronics provided in a vehicle constructed and arranged according to the system and method of the present invention to effect temperature dependent control of brake actuation energy.

Referring now to the drawing figures, in which like reference numerals are used for corresponding parts and in which energy conduits, such as, for example, pressure conduits, are depicted in solid lines and electrical conductors are depicted in broken lines, FIG. 1 shows a schematic diagram of a vehicle 1 equipped with an EBS 2 constructed and arranged in accordance with a preferred embodiment of the present invention. EBS 2 can be pneumatically operated, for example.

For both a front axle FA and a rear axle RA of vehicle 1, only the vehicle wheels and associated components, such as, for example, pneumatic components, of one side of the vehicle are depicted.

EBS 2 preferably includes a central control unit 4 for control of brake actuation energy. Central control unit 4 can also desirably include an integrated anti-lock brake system ("ABS").

Energy, such as, for example, compressed air, for actuation of the vehicle brakes is preferably stored in energy accumulators 6, 8 (e.g., compressed air reservoirs).

Preferably, a brake signal transmitter 10 is provided for use by the vehicle driver to transmit set values to EBS 2.

An energy allocator 14, such as, for example, a pressure modulator, is preferably electrically connected to a brake actuation device 16, such as, for example, a brake cylinder, for a wheel having a wheel brake 18 on front axle FA. A further energy allocator 22 (e.g., a pressure modulator) is preferably electrically connected to a brake actuation device 24 (e.g., a brake cylinder) for a vehicle wheel having wheel brake 26 on rear axle RA.

Wheel sensors 28, 30 are preferably used to monitor how the vehicle wheels are revolving. If the wheels exhibit a lockup tendency, control unit 4 or the ABS integrated in the control unit transmits, in known manner, electrical signals to energy allocators 14, 22 which reduce the brake actuation energy, such as, for example, brake pressure, and are thus able to eliminate lockup tendency.

Central control unit 4 preferably includes inputs for energy sensors 32, 44, such as, for example, pressure sensors, for determination of the brake actuation energy, such as, for example, brake pressure, in brake actuation devices 16, 24 (e.g., brake cylinders) of front and rear axles FA and RA. Central control unit 4 also desirably includes inputs for devices 36, 38, such as, for example, temperature sensors, for measuring the temperature of wheel brakes 18, 26, preferably continuously.

Central control unit 4 is preferably adapted to compare the determined temperatures of wheel brakes 18, 26 of the vehicle wheels of front axle FA and rear axle RA with one another and with a preset temperature limit value. If the determined temperatures equal or exceed the preset temperature limit value during vehicle braking, the energy distribution, such as, for example, pressure distribution, between the wheel brakes can be adjusted such that, by comparison with the status before the limit value was reached, less brake actuation energy (e.g., a lower brake pressure) is introduced into the wheel brakes with the higher temperatures, while more brake actuation energy (e.g., a higher brake pressure) is introduced into the wheel brakes with the lower temperatures. For example, if the temperature of the rear axle (RA) brakes reaches the limit value and is higher than the temperature of the front axle (FA) brakes, the rear axle brakes will be loaded more lightly than before the temperature limit value was reached in order to reduce the temperature difference between the axles. For this purpose, a suitable additional electronic device 40 in central control unit 4 and/or a corresponding program expansion in the computer processor contained in the central control unit can be provided. The corresponding distribution of brake actuation energy between the wheel brakes, wherein, for example, lower pressure is introduced into the brake cylinders of the hotter brakes, is preferably brought about via energy allocators 14, 22 of EBS 2, but can also be achieved via separate energy allocators (not shown in FIG. 1).

Figure 2:
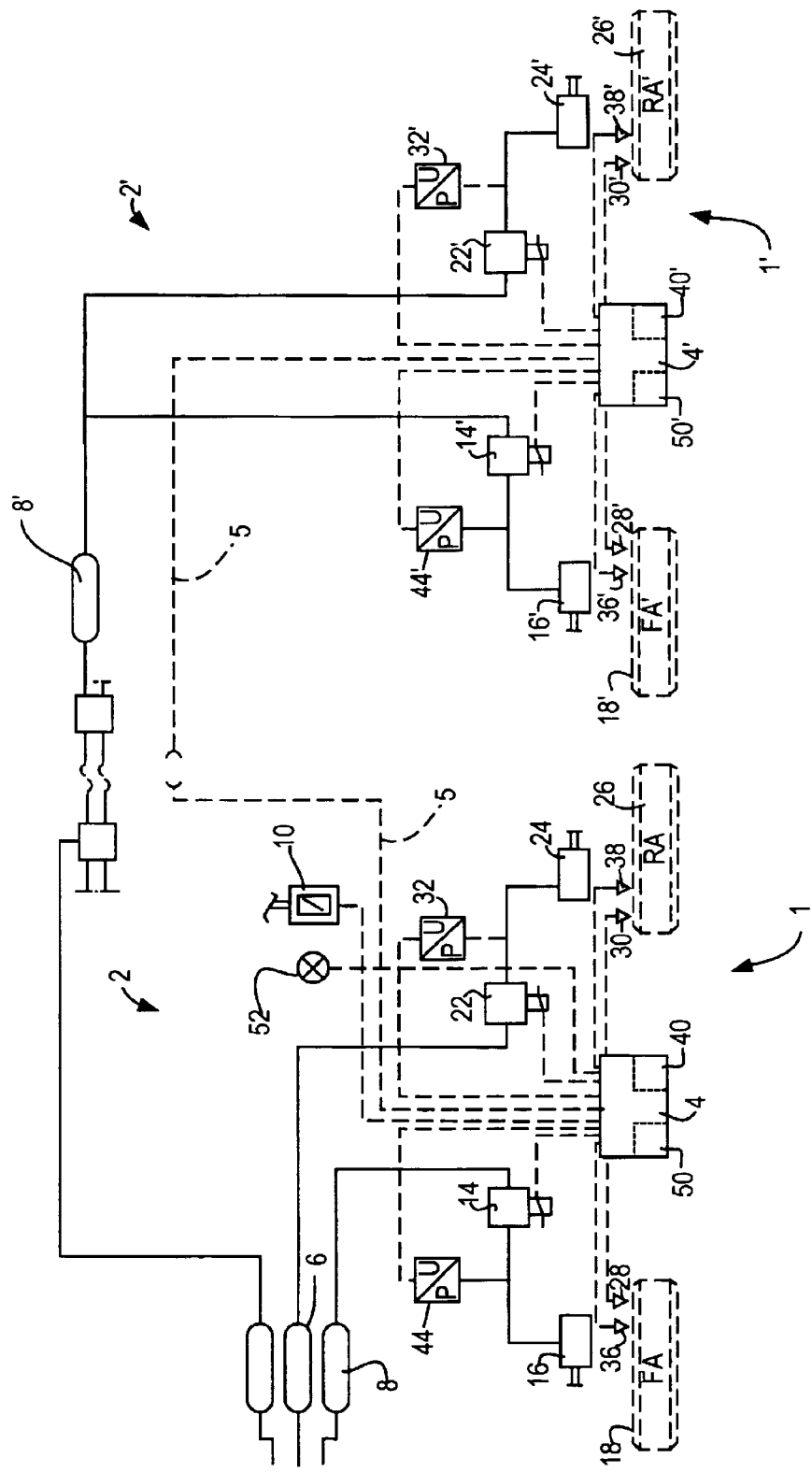
FIG. 2 is a schematic diagram depicting EBS control electronics provided in a tractor and trailer vehicle combination constructed and arranged according to the system and method of the present invention to effect temperature dependent control of brake actuation energy.

Referring now to FIG. 2, there is shown a schematic diagram of a vehicle train including tractor vehicle train part 1 and a trailer vehicle train part 1'. Tractor and trailer vehicle train parts 1 and 1' are equipped with EBSs 2, 2', respectively, which, for example, can be pneumatically operated.

For both front axles FA, FA' and rear axles RA, RA' of vehicle train parts 1, 1', only the wheels and associated components, such as pneumatic components, of one side of the vehicle train are depicted in FIG. 2.

EBSs 2 and 2' preferably include central control units 4, 4', respectively, for control of brake actuation energy. Central control units 4, 4' can also desirably include an integrated ABS. Central control units 4, 4' are preferably electrically connected to one another via a signal circuit 5.

Energy, such as, for example, compressed air, needed for actuation of the vehicle train brakes is preferably stored in energy accumulators 6, 8, 8' (e.g., compressed air reservoirs).

Preferably, brake signal transmitter 10 in tractor vehicle train part 1 is provided for use by the vehicle train driver to input a set value to EBSs 2, 2'.

Each of EBSs 2, 2' preferably includes two circuits. One circuit includes energy allocators 14, 14' (e.g., pressure modulators), electrically connected to brake actuation devices 16, 16' (e.g., brake cylinders) for wheels having wheel brakes 18, 18' on front axles FA, FA'. The other circuit includes further energy allocators 22, 22' (e.g., pressure modulators) electrically connected to brake actuation devices 24, 24' (e.g., brake cylinders) for wheels having wheel brakes 26, 26' on rear axles RA, RA'.

Wheel sensors 28, 28', 30, 30' are preferably used to monitor how the vehicle train wheels are revolving. If the wheels exhibit a lockup tendency, control units 4, 4' or the ABS integrated in the control units transmit, in known manner, electrical signals to energy allocators 14, 14', 22, 22' which reduce brake actuation energy (e.g., brake pressure) and are thus able to eliminate lockup tendency.

Central control units 4, 4' preferably include inputs for energy sensors 32, 32', 44, 44' (e.g., pressure sensors) for determination of brake actuation energy (e.g., brake pressures) in brake actuation devices 16, 16', 24, 24' (e.g., brake cylinders) of front and rear axles FA, FA', RA, RA'. Central control units 4, 4' also desirably include inputs for devices 36, 36', 38, 38' (e.g., temperature sensors) for measuring the temperatures of wheel brakes 18, 18', 26, 26', preferably continuously.

Central control units 4, 4' are preferably adapted to compare the determined temperatures of wheel brakes 18, 18', 26, 26' of the wheels of vehicle train parts 1, 1' with one another for the respective vehicle train part, and with a preset temperature limit value. If, during braking, the determined temperatures differ from one another by at least a preset value and the temperatures of the wheel brakes of at least one of vehicle train parts 1, 1' equal or exceed the preset temperature limit value, less brake actuation energy (e.g., a lower brake pressure) is provided to the wheel brakes of the vehicle train part having higher wheel brake temperatures (i.e., than was the case before the temperature limit value was reached), while more brake actuation energy (e.g., a higher brake pressure) is provided to the wheel brakes having lower temperatures (i.e., than was the case before the temperature limit value was reached). For this purpose, one or more suitable additional electronic devices 40, 40' in central control units 4, 4' and/or corresponding program expansions in the computer processors contained in the central control units can be provided. The corresponding distribution of brake actuation energy between wheel brakes 18, 18', 26, 26' of vehicle train parts 1, 1', wherein, for example, lower pressure is provided to the brake cylinders of the hotter brakes, is preferably brought about via energy allocators 14, 14', 22, 22' of EBSs 2, 2', but can also be achieved via separate energy allocators (not shown in FIG. 2).

EBSs 2, 2' can be programmed such that the set brake actuation energy of the trailer vehicle train part or the set brake actuation energy of the tractor vehicle train part is lowered or raised as a function of the determined wheel brake temperatures. Also, EBSs 2, 2' can be programmed such that, when the set brake actuation energy of the trailer vehicle train part is lowered, the set brake actuation energy of the tractor vehicle train part is simultaneously raised, and, when the set brake actuation energy of the trailer vehicle train part is raised, the set brake actuation energy of the tractor vehicle train part is simultaneously lowered. Such changes of set brake actuation energy of the vehicle train parts can have a neutral effect on total braking power or, if necessary, cause a reduction in total braking power.

Control approaches which take wheel brake temperatures into consideration (active brake overload protection) have been described with reference to FIGS. 1 and 2. The system and method according to the present invention builds on these active approaches.

Brake overload protection described with reference to FIGS. 1 and 2 involves evaluation of wheel brake temperatures. Comparisons are made to determine whether some brakes are overloaded unilaterally or whether all brakes are exhibiting undesired high temperatures. In the first case, temperature compensating actions are initiated in order to increase the relative degree of protection of the more highly loaded wheel brakes. In the second case, temperature compensating actions are not initiated, however, a warning should be delivered to the vehicle driver.

Preferably, at least one of central control units 4, 4' is provided with an electronic device 50, 50' (FIGS. 1 and 2), or corresponding program expansions in the computer processors in the central control units, for generating a warning signal of a brake overload condition. The warning signal can be communicated to the vehicle driver via brake pedal feel and/or, via a device 52 (FIGS. 1 and 2), visually and/or audibly.

The wheel brake temperatures or mean values of wheel brake temperatures are evaluated for the respective wheels or respective axles specific to the vehicle or vehicle train part.

A level 1 warning is preferably output if temperatures equal to or exceeding the preset temperature limit value exist on an axle of vehicle 1 (FIG. 1) or of vehicle train parts 1, 1' (FIG. 2). A level 2 warning is preferably output if temperatures equaling or exceeding the temperature limit value exist on more than one axle of vehicle 1 or of a vehicle train part 1, 1' (a more serious condition). A level 2 warning is also transmitted if wheel brake temperatures equaling or exceeding the temperature limit value exist in both or all vehicle train parts.

In the case of an audible warning, the frequency of the acoustic signal can depend on the warning level: the higher the warning level, the higher the frequency of the acoustic signal. The frequency of the acoustic signal can also depend on the determined absolute peak brake temperature reaching the temperature limit value: the higher the peak temperature, the higher the frequency.

The visual warning can take the form of a flashing light, for example, and the flashing frequency can be dependent on the warning level or on the value of the peak brake temperature: the higher the warning level or the peak temperature, the higher the flashing frequency.

For a visual warning to the driver, it is possible, for example, to provide a display device showing a vehicle or vehicle train schematic including a depiction of the wheels. At determined temperatures or mean values of temperatures equaling or exceeding the limit value, the respective wheels of the wheel brakes depicted in the schematic desirably flash or glow. The absolute temperatures can be indicated in the same display. Also, the flashing frequency can be made to depend on the warning level or on the value of the determined absolute temperature.

In order to communicate a warning to the vehicle driver via the brake pedal, it is possible, for the case of wheel brake temperatures equaling or exceeding the preset limit value, to flatten out a stored brake pedal feeling curve as a function of the respective danger potential, or in other words as a function of the absolute values of the peak temperature and/or of the average temperature or of the warning level. For this purpose, the feeling curve can be flattened out in steps. For example, the feeling curve can be flattened out by one step if only one vehicle train part of a vehicle train exhibits wheel brake temperatures at or above the limit value, and it can be flattened out by two steps if both vehicle train parts exhibit wheel brake temperatures at or above the limit value.

If the brakes of the trailer vehicle train part become too hot, and thereby the brake actuation energy demanded from it is reduced, the vehicle train deceleration control system is deactivated. Compensation is no longer applied if underbraking of the vehicle subsequently develops. As a consequence, the driver is made aware of underbraking by the sensation of brake fade which can serve as a corresponding warning.

If the brakes of the tractor vehicle train part become too hot, and thereby the brake actuation energy demanded from the wheel brakes of the trailer vehicle is increased, the vehicle deceleration control system remains active. Consequently, the feeling curve can be flattened out; this is communicated to the driver via the brake pedal feel.

It is also possible to lower the brake actuation energy level, resulting in an immediate decrease of the actual vehicle deceleration, which is also sensed by the driver as brake fade.

The warning system and method described above can be combined with an engine power limitation system, in order to bring about a reduction of the permissible engine torque in overload situations. It is also possible to prevent further driving at higher speed in the observed overload case. Under these conditions automatic transmissions no longer upshift, thus ensuring that kinetic energy remains relatively low and that the braking effect of the engine becomes greater.

If wheel brake temperatures equal to or in excess of the preset limit value are present, external set braking requirements of, for example, distance control systems, speed control systems, traction control systems, drive slip control systems, etc. are disabled or are enabled to only a limited extent. For example, drive slip control systems are enabled without restriction only if the hot brakes are not those of the driving axle. If these brakes are already at a relatively high temperature level, however, further drive slip control processes are enabled only with restrictions, such as a time limitation, only up to a certain temperature level, or in accordance with comparable criteria for protection of the wheel brakes.

Figure 3A:
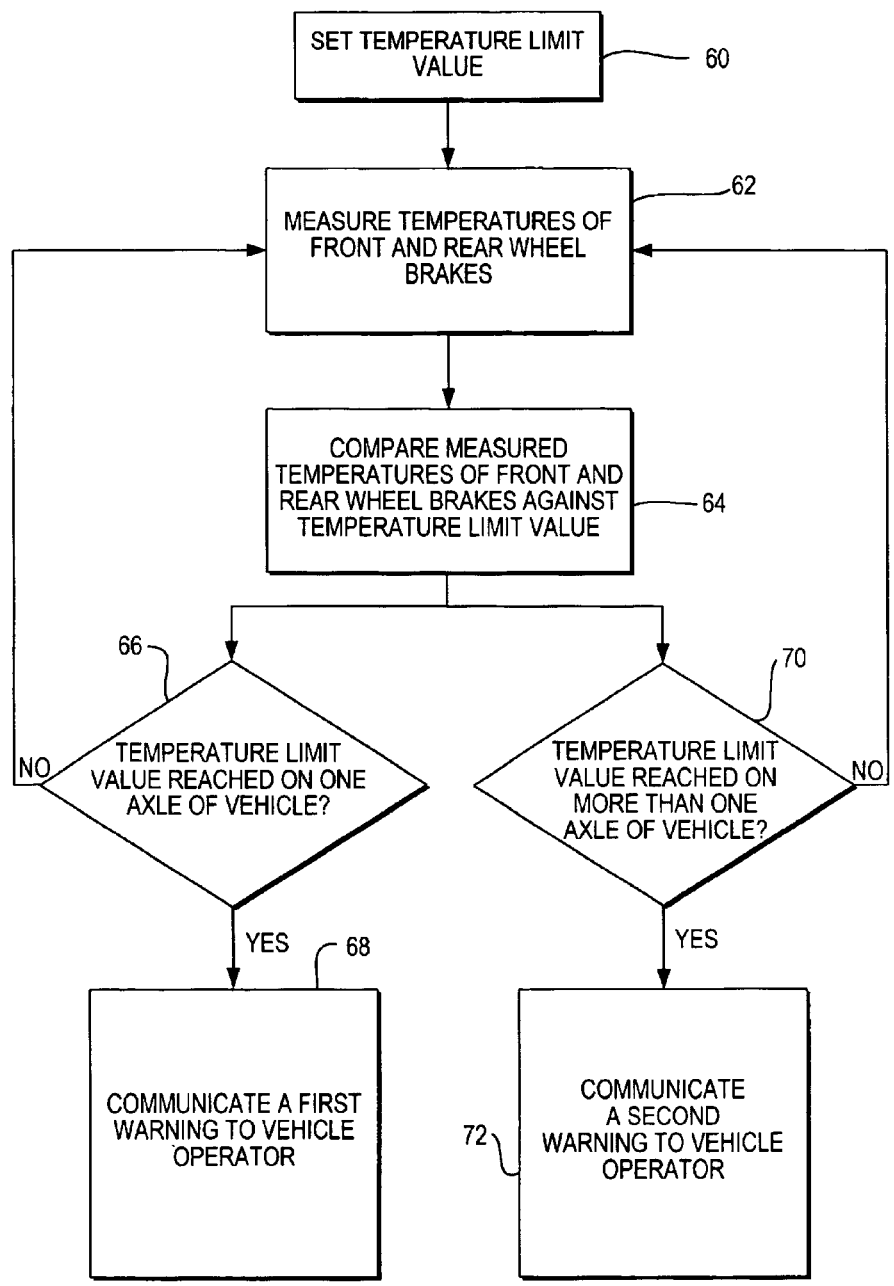
FIGS. 3a and 3b are flow charts depicting process steps for monitoring brakes of EBSs of vehicles and vehicle combinations for temperature induced overload and for warning the driver of the vehicle or vehicle combination of an overload condition according to preferred embodiments of the method of the present invention.

Referring now to FIG. 3*a*, there is shown the process for monitoring wheel brakes for overload in a vehicle according to a preferred method of the present invention. According to the preferred method, a temperature limit value is set for the wheel brakes of the vehicle (step 60). The temperatures of the wheel brakes of the vehicle are ascertained (step 62) and compared against the temperature limit value (step 64). If, during braking, the temperature limit value is reached on one axle of the vehicle (decision 66), a level 1 warning is communicated to the driver of the vehicle (step 68). If the temperature limit value is reached on more than one axle of the vehicle (decision 70), a level 2 warning is communicated to the driver (step 72).

Figure 3B:
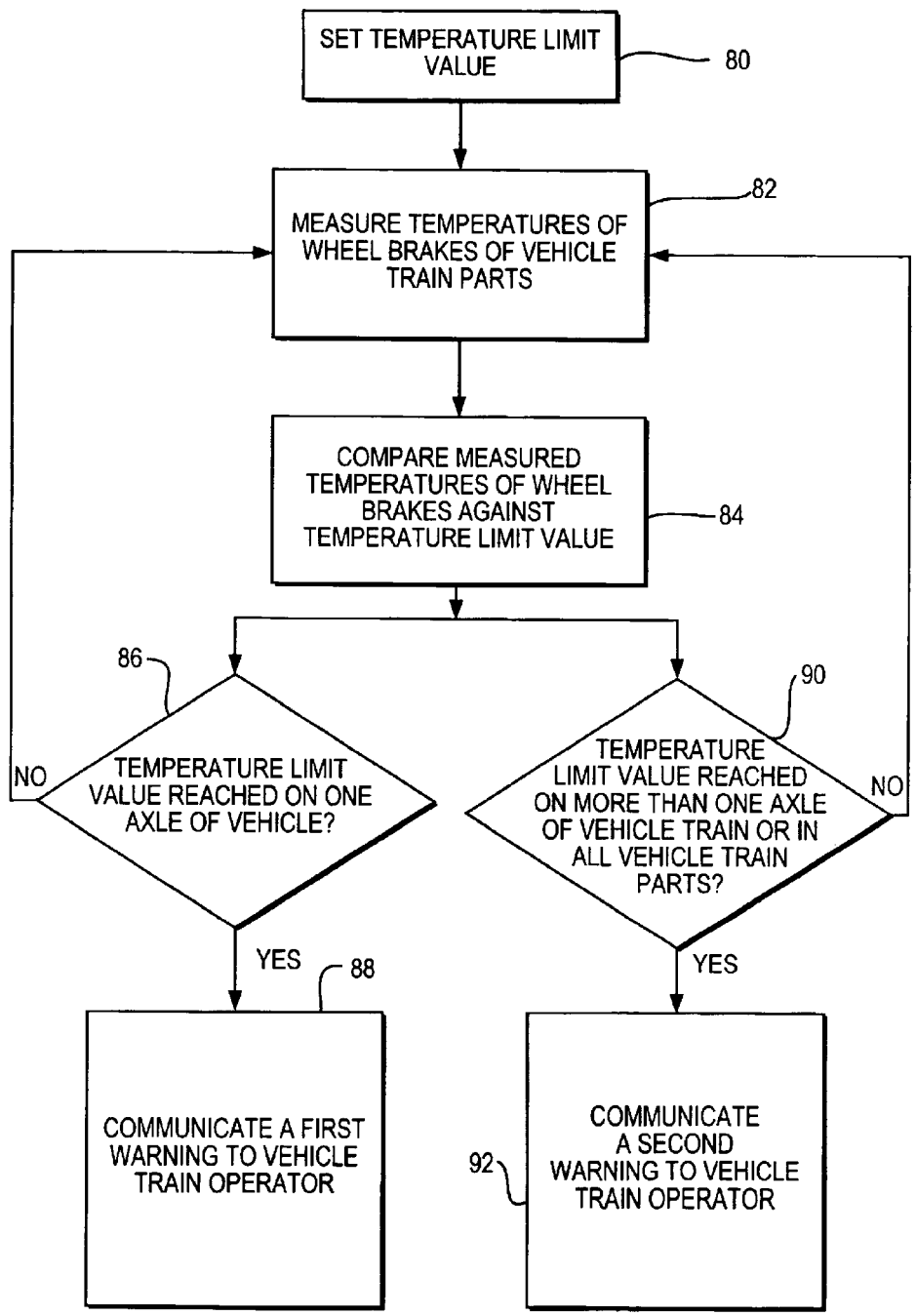

Referring now to FIG. 3*b*, there is shown the process for monitoring wheel brakes for overload in a vehicle train according to a preferred method of the present invention. According to the preferred method, a temperature limit value is set for the wheel brakes of the vehicle train (step 80). The temperatures of the wheel brakes of the vehicle train are ascertained (step 82) and compared against the temperature limit value (step 84). If, during braking, the temperature limit value is reached on one axle of the vehicle train (decision 86), a level 1 warning is communicated to the driver of the vehicle train (step 88). If the temperature limit value is reached on more than one axle of the vehicle train or in all vehicle train parts (decision 90), a level 2 warning is communicated to the driver (step 92).

Accordingly, the present invention provides a system and method for monitoring brakes of EBSs of vehicles and vehicle combinations for temperature-induced overload and for warning the driver of such vehicle or vehicle combination of various temperature-induced brake overload conditions.

It will thus be seen that the objects set forth above, among those made apparent from the preceding description, are efficiently attained, and since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A method for monitoring brakes in an electronically controlled brake system of a vehicle for overload, the vehicle having a front axle including front wheels and front wheel brakes and a rear axle including rear wheels and rear wheel brakes, the method comprising the steps of setting a temperature limit value for said front and rear wheel brakes, ascertaining temperature values of said front and rear wheel brakes, comparing said temperature values of said front and rear wheel brakes with said temperature limit value, communicating a first warning to an operator of said vehicle if an individual one of said ascertained temperature values of said front and rear wheel brakes reaches said temperature limit value, and communicating a second warning to said operator of said vehicle if said ascertained temperature values of at least one of said front wheel brakes and at least one of said rear wheel brakes reach said temperature limit value.

2. The method according to claim 1, wherein said ascertained temperature values are at least one of measured values and calculated mean values of measured values.

3. The method according to claim 1, wherein said steps of communicating said first and second warnings include actuating at least one of an audible, visual and tactile signal.

4. The method according to claim 3, wherein said first and second warnings are audible signals, said audible signal for said first warning having a first frequency and said audible signal for said second warning having a second frequency different than said first frequency.

5. The method according to claim 3, wherein said first and second warnings are audible signals having respective first and second frequencies, and further comprising the step of adjusting at least one of said first and second frequencies as a function of the absolute values of said ascertained temperature values of said wheel brakes at least one of equal to or in excess of said temperature limit value.

6. The method according to claim 3, wherein said first and second warnings are visual signals having respective first and second frequencies, and further comprising the step of adjusting at least one of said first and second frequencies as a function of the absolute values of said ascertained temperature values of said wheel brakes at least one of equal to or in excess of said temperature limit value.

7. The method according to claim 3, wherein said first and second warnings are visual signals including flashing lights.

8. The method according to claim 7, wherein said visual flashing light signal for said first warning has a first flashing frequency and said visual flashing light signal for said second warning has a second flashing frequency different than said first flashing frequency.

9. The method according to claim 7, further comprising the step of displaying representations of said front and rear wheel brakes using a display device including said flashing lights, said flashing lights being in associative relationship to said representations of said front and rear wheel brakes such that said representations associated with individual ones of said front and rear wheel brakes having ascertained temperature values at least one of equal to or in excess of said temperature limit value flash at a frequency dependent on at least one of said first and second warnings and on the absolute values of said ascertained temperature values at least one of equal to or in excess of said temperature limit value.

10. The method according to claim 9, further comprising the step of displaying on said display device said ascertained temperature values of said front and rear wheel brakes in associative relationship to said representations of said front and rear wheel brakes.

11. The method according to claim 3, wherein said first and second warnings are tactile signals, said tactile signals being effected as adjustments to a brake pedal of said vehicle according to a stored feeling curve.

12. The method according to claim 11, further comprising the step of traversing said feeling curve at least one of steadily and stepwise as a function of at least one of said first and second warnings and of absolute peak values of said ascertained temperature values of said wheel brakes.

13. The method according to claim 3, wherein said first and second warnings are tactile signals and a fading sensation representing vehicle underbraking is communicated to said operator of said vehicle if said ascertained temperatures of said wheel brakes reach said temperature limit value and brake actuation energy in said vehicle is reduced.

14. The method according to claim 1, further comprising the step of at least one of disabling and enabling to only a limited extent external set braking requirements of said vehicle including at least one of a traction control device, a drive slip control system and a speed control system if said ascertained temperature values of said wheel brakes reach said temperature limit value.

15. The method according to claim 1, further comprising the step of limiting engine power and reducing engine torque in said vehicle if said ascertained temperature values of said wheel brakes reach said temperature limit value.

16. The method according to claim 1, further comprising the step of preventing upshifting of a transmission of said vehicle to avoid excessive vehicle speed if said ascertained temperature values of said wheel brakes reach said temperature limit value.

17. The method according to claim 1, further comprising the step of displaying said ascertained temperature values of said front and rear wheel brakes on a display device including representations of said front and rear wheel brakes, said ascertained temperature values being in associative relationship to said representations.

18. A method for monitoring brakes for overload in electronically controlled brake systems of a vehicle train including a first vehicle train part and at least one additional vehicle train part coupled thereto, the first vehicle train part including front and rear axles having first wheels and first wheel brakes, the at least one additional vehicle train part including additional front and rear axles, additional wheels and additional wheel brakes, the method comprising the steps of setting a temperature limit value for said first wheel brakes and said additional wheel brakes, ascertaining temperature values of said first wheel brakes and said additional wheel brakes, comparing said ascertained temperature values of said first wheel brakes and said additional wheel brakes against said temperature limit value, communicating a first warning to an operator of said vehicle train if an individual one of said ascertained temperature values of said wheel brakes of said first vehicle train part and said at least one additional vehicle train part reaches said temperature limit value, and communicating a second warning to said operator of said vehicle train if at least one of (i) said ascertained temperature values of at least one of said first wheel brakes on said front axle and at least one of said first wheel brakes on said rear axle of said first vehicle train part reach said temperature limit value, (ii) said ascertained temperature values of at least one of said additional wheel brakes on said front axle and at least one of said additional wheel brakes on said rear axle of said at least one additional vehicle train part reach said temperature limit value and (iii) said ascertained temperature values of at least one of said first wheel brakes and at least on of said additional wheel brakes reach said temperature limit value.

19. The method according to claim 18, wherein said ascertained temperature values are at least one of measured values and calculated mean values of measured values.

20. The method according to claim 18, wherein said steps of communicating said first and second warnings include actuating at least one of an audible, visual and tactile signal.

21. The method according to claim 20, wherein said first and second warnings are audible signals, said audible signal for said first warning having a first frequency and said audible signal for said second warning having a second frequency different than said first frequency.

22. The method according to claim 20, wherein said first and second warnings are audible signals having respective first and second frequencies, and further comprising the step of adjusting at least one of said first and second frequencies as a function of the absolute values of said ascertained temperature values of said first and said additional wheel brakes at least one of equal to or in excess of said temperature limit value.

23. The method according to claim 20, wherein said first and second warnings are visual signals having respective first and second frequencies, and further comprising the step of adjusting at least one of said first and second frequencies as a function of the absolute values of said ascertained temperature values of said first and said additional wheel brakes at least one of equal to or in excess of said temperature limit value.

24. The method according to claim 20, wherein said first and second warnings are visual signals including flashing lights.

25. The method according to claim 24, wherein said visual flashing light signal for said first warning has a first flashing frequency and said visual flashing light signal for said second warning has a second flashing frequency different than said first flashing frequency.

26. The method according to claim 24, further comprising the step of displaying representations of said first and said additional wheel brakes using a display device including said flashing lights, said flashing lights being in associative relationship to said representations of said first and said additional wheel brakes such that said representations associated with individual ones of said first and said additional wheel brakes having ascertained temperature values at least one of equal to or in excess of said temperature limit value flash at a frequency dependent on at least one of said first and second warnings and on the absolute values of said ascertained temperature values at least one of equal to or in excess of said temperature limit value.

27. The method according to claim 26, further comprising the step of displaying on said display device said ascertained temperature values of said first and said additional wheel brakes in associative relationship to said representations of said first and said additional wheel brakes.

28. The method according to claim 20, wherein said first and second warnings are tactile signals and a fading sensation representing vehicle train underbraking is communicated to said operator of said vehicle train if said ascertained temperature values of said wheel brakes of said at least one additional vehicle train part reach said temperature limit value.

29. The method according to claim 20, wherein said first and second warnings are tactile signals and a fading sensation representing vehicle train underbraking is communicated to said operator of said vehicle train if said ascertained temperatures of said wheel brakes of said first vehicle train part reach said temperature limit value and brake actuation energy in said vehicle train is reduced.

30. The method according to claim 20, wherein said first and second warnings are tactile signals, said tactile signals being effected as adjustments to a brake pedal of said vehicle train according to a stored feeling curve.

31. The method according to claim 30, further comprising the step of traversing said feeling curve at least one of steadily and stepwise as a function of at least one of said first and second warnings and of absolute peak values of said ascertained temperature values of said first and said additional wheel brakes.

32. The method according to claim 31, further comprising the steps of traversing said feeling curve by a single step if only one of said first vehicle train part and said at least one additional vehicle train part has ascertained temperature values above said temperature limit value, and traversing said feeling curve by a plurality of steps if both said first vehicle train part and said at least one additional vehicle train part have ascertained temperature values above said temperature limit value.

33. The method according to claim 18, further comprising the step of at least one of disabling and enabling to only a limited extent external set braking requirements of said vehicle train including at least one of a distance control device, a traction control device, a drive slip control system and a speed control system if said ascertained temperature values of said first and said additional wheel brakes reach said temperature limit value.

34. The method according to claim 18, further comprising the step of limiting engine power and reducing engine torque in said vehicle train if said ascertained temperature values of said first and said additional wheel brakes reach said temperature limit value.

35. The method according to claim 18, further comprising the step of preventing upshifting of a transmission of said vehicle train to avoid excessive vehicle train speed if said ascertained temperature values of said first and said additional wheel brakes reach said temperature limit value.

36. The method according to claim 18, further comprising the step of displaying said ascertained temperature values of said first and said additional wheel brakes on a display device including representations of said first and said additional wheel brakes, said ascertained temperature values being in associative relationship to said representations.

37. The method according to claim 18, wherein said vehicle train includes at least one coupling force control system for matching deceleration of said at least one additional vehicle train part caused by said additional wheel brakes to deceleration of said first vehicle train part caused by said first wheel brakes so that at least one of a force of zero magnitude and a force of small magnitude is transmitted between said at least one additional vehicle train part and said first vehicle train part during vehicle train braking.

38. A system for monitoring wheel brakes in an electronically controlled brake system of a vehicle for overload, the vehicle having, a front axle including front wheels and front wheel brakes and a rear axle including rear wheels and rear wheel brakes, the system comprising means for ascertaining temperature values of said front and rear wheel brakes, means for setting a temperature limit value for said front and rear wheel brakes, means for comparing said ascertained temperature values of said wheel brakes against said temperature limit value, and means for warning an operator of said vehicle if said ascertained temperature values of said front and rear wheel brakes reach said temperature limit value.

39. The system according to claim 38, wherein said ascertained temperature values are at least one of measured values and calculated mean values of measured values.

40. The system according to claim 38, wherein said means for ascertaining temperature values of said front and rear wheel brakes includes at least one temperature sensor.

41. The system according to claim 38, wherein said means for ascertaining temperature values of said front and rear wheel brakes includes means for calculating said ascertained temperature values according to a temperature model which takes into consideration at least one of a brake load signal representative of the load condition of said wheel brakes, heat energy supply to said wheel brakes, deformation of component parts of said wheel brakes, and instantaneous vehicle deceleration and vehicle speed.

42. The system according to claim 38, wherein said electronically controlled brake system includes a control unit, said control unit being associated with at least one of said means for setting a temperature limit value for said front and rear wheel brakes, means for comparing said ascertained temperature values of said wheel brakes against said temperature limit value, and means for warning an operator of said vehicle if said ascertained temperature values of said front and rear wheel brakes reach said temperature limit value.

43. The system according to claim 42, wherein said control unit is constructed and arranged to determine peak values of said ascertained temperature values of individual ones of said front and rear wheel brakes that reach said temperature limit value.

44. The system according to claim 38, further comprising an evaluation device separate from said electronically controlled brake system, said evaluation device being associated with at least one of said means for setting a temperature limit value for said front and rear wheel brakes, means for comparing said ascertained temperature values of said wheel brakes against said temperature limit value, and means for warning an operator of said vehicle if said ascertained temperature values of said front and rear wheel brakes reach said temperature limit value.

45. The system according to claim 44, wherein said evaluation device is constructed and arranged to determine peak values of said ascertained temperature values of individual ones of said front and rear wheel brakes that reach said temperature limit value.

46. The system according to claim 38, wherein said means for warning an operator of said vehicle if said ascertained temperature values of said front and rear wheel brakes reach said temperature limit value includes means for communicating a first warning to said operator of said vehicle if an individual one of said ascertained temperature values of said front and rear wheel brakes reaches said temperature limit value, and means for communicating a second warning to said operator of said vehicle if said ascertained temperature values of at least one of said front wheel brakes and at least one of said rear wheel brakes reach said temperature limit value.

47. The system according to claim 46, wherein said means for warning said operator of said vehicle includes means for actuating at least one of an audible, visual and tactile warning device.

48. The system according to claim 47, wherein said warning is an audible warning and said audible warning device is constructed and arranged to output an audible signal having a frequency which varies as a function of at least one of said first and second warnings and the absolute values of said ascertained temperature values of said front and rear wheel brakes.

49. The system according to claim 47, wherein said warning is a visual warning and said visual warning device is constructed and arranged to output a visual signal having a frequency which varies as a function of at least one of said first and second warnings and the absolute values of said ascertained temperature values of said front and rear wheel brakes.

50. The system according to claim 47, wherein said visual warning device includes display means including representations of said front and rear wheel brakes, said display means constructed and arranged such that said representations associated with individual ones of said front and rear wheel brakes having ascertained temperature values at least one of equal to or in excess of said temperature limit value are lighted.

51. The system according to claim 50, wherein said display means is constructed and arranged to display the absolute values of said ascertained temperature values of said front and rear wheel brakes at least one of equal to or in excess of said temperature limit value.

52. The system according to claim 47, wherein said warning is a tactile warning and said tactile warning device is constructed and arranged to effect adjustments to a brake pedal of said vehicle according to a stored feeling curve.

53. The system according to claim 52, wherein said feeling curve is traversed as a function of at least one of the absolute values of said ascertained temperature values of said front and rear wheel brakes and said first and second warnings if said temperatures of said wheel brakes reach said temperature limit value.

54. The system according to claim 52, wherein said feeling curve is stored in a control unit of said electronically controlled brake system.

55. The system according to claim 52, wherein said feeling curve is stored in an evaluation device separate from said electronically controlled brake system.

56. The system according to claim 47, wherein said warning is a tactile warning effected by adjustment to brake actuation energy in said vehicle, said warning being a fading sensation representing vehicle underbraking.

57. The system according to claim 38, further comprising means for at least one of disabling and enabling to only a limited extent external set braking requirements of said vehicle including at least one of a traction control device, a drive slip control system and a speed control system if said ascertained temperature values of said wheel brakes reach said temperature limit value.

58. The system according to claim 38, further comprising means for limiting engine power and reducing engine torque in said vehicle if said ascertained temperature values of said wheel brakes reach said temperature limit value.

59. The system according to claim 38, further comprising means for preventing excessive vehicle speed if said ascertained temperature values of said wheel brakes reach said temperature limit value.

60. The system according to claim 59, wherein said means for preventing excessive vehicle speed includes means for preventing upshifting of a transmission of said vehicle.

61. A system for monitoring brakes for overload in electronically controlled brake systems of a vehicle train including a first vehicle train part and at least one additional vehicle train part coupled thereto, the first vehicle train part including front and rear axles having first wheels, first wheel brakes and a first electronically controlled brake system for controlling the first wheel brakes, the at least one additional vehicle train part including additional front and rear axles, additional wheels, additional wheel brakes and at least one additional electronically controlled brake system for controlling the additional wheel brakes, the system comprising means for ascertaining temperature values of said first wheel brakes and said additional wheel brakes, means for setting a temperature limit value for said first wheel brakes and said additional wheel brakes, means for comparing said ascertained temperature values of said wheel brakes against said temperature limit value, and means for warning an operator of said vehicle train if said ascertained temperature values of said wheel brakes reach said temperature limit value.

62. The system according to claim 61, wherein said ascertained temperature values are at least one of measured values and calculated mean values of measured values.

63. The system according to claim 61, wherein said means for ascertaining temperature values of said first wheel brakes and said additional wheel brakes includes at least one temperature sensor.

64. The system according to claim 61, wherein said means for ascertaining temperature values of said first wheel brakes and said additional wheel brakes includes means for calculating said temperature values according to a temperature model which takes into consideration at least one of a brake load signal representative of the load condition of said wheel brakes, heat energy supply to said wheel brakes, deformation of component parts of said wheel brakes, and instantaneous vehicle train deceleration and vehicle train speed.

65. The system according to claim 61 wherein said first electronically controlled brake system includes a first control unit and said at least one additional electronically controlled brake system includes at least one additional control unit, said first control unit and said at least one additional control unit being associated with at least one of said means for setting a temperature limit value for said first wheel brakes and said additional wheel brakes, means for comparing said ascertained temperature values of said wheel brakes against said temperature limit value, and means for warning an operator of said vehicle train if said ascertained temperature values of said wheel brakes reach said temperature limit value.

66. The system according to claim 65, wherein said first control unit and said at least one additional control unit are constructed and arranged to determine peak values of said ascertained temperature values of individual ones of said wheel brakes that reach said temperature limit value.

67. The system according to claim 61, further comprising at least one evaluation device separate from said first electronically controlled brake system and said at least one additional electronically controlled brake system, said at least one evaluation device being associated with at least one of said means for setting a temperature limit value for said wheel brakes, means for comparing said ascertained temperature values of said wheel brakes against said temperature limit value, and means for warning an operator of said vehicle train if said ascertained temperature values of said wheel brakes reach said temperature limit value.

68. The system according to claim 67, wherein said at least one evaluation device is constructed and arranged to determine peak values of said ascertained temperature values of individual ones of said wheel brakes that reach said temperature limit value.

69. The system according to claim 61, wherein said means for warning an operator of said vehicle train if said ascertained temperature values of said first wheel brakes and said additional wheel brakes reach said temperature limit value includes means for communicating a first warning to said operator of said vehicle train if an individual one of said ascertained temperature values of said wheel brakes of said first vehicle train part and said at least one additional vehicle train part reaches said temperature limit value, and means for communicating a second warning to said operator of said vehicle train if at least one of (i) said ascertained temperature values of at least one of said first wheel brakes on said front axle and at least one of said first wheel brakes on said rear axle of said first vehicle train part reach said temperature limit value, (ii) said ascertained temperature values of at least one of said additional wheel brakes on said front axle and at least one of said additional wheel brakes on said rear axle of said at least one additional vehicle train part reach said temperature limit value and (iii) said ascertained temperature values of at least one of said first wheel brakes and at least on of said additional wheel brakes reach said temperature limit value.

70. The system according to claim 69, wherein said means for warning said operator of said vehicle train includes means for actuating at least one of an audible, visual and tactile warning device.

71. The system according to claim 70, wherein said warning is an audible warning and said audible warning device is constructed and arranged to output an audible signal having a frequency which varies as a function of at least one of said first and second warnings and the absolute values of said ascertained temperature values of said wheel brakes.

72. The system according to claim 70, wherein said warning is a visual warning and said visual warning device is constructed and arranged to output a visual signal having a frequency which varies as a function of at least one of said first and second warnings and the absolute values of said ascertained temperature values of said wheel brakes.

73. The system according to claim 70, wherein said visual warning device includes display means including representations of said first wheel brakes and said additional wheel brakes, said display means constructed and arranged such that said representations associated with individual ones of said wheel brakes having ascertained temperature values at least one of equal to or in excess of said temperature limit value are lighted.

74. The system according to claim 73, wherein said display means is constructed and arranged to display the absolute values of said ascertained temperature values of said first wheel brakes and said additional wheel brakes at least one of equal to or in excess of said temperature limit value.

75. The system according to claim 70, wherein said warning is a tactile warning and said tactile warning device is constructed and arranged to effect adjustments to a brake pedal of said vehicle train according to a stored feeling curve.

76. The system according to claim 75, wherein said feeling curve is traversed as a function of at least one of the absolute values of said ascertained temperature values of said wheel brakes and said first and second warnings if said ascertained temperature values of said wheel brakes reach said temperature limit value.

77. The system according to claim 75, wherein said feeling curve is stored in at least one of a first control unit of said first electronically controlled brake system and an additional control unit of said at least one additional electronically controlled brake system.

78. The system according to claim 75, wherein said feeling curve is stored in at least one evaluation device separate from said first electronically controlled brake system and said at least one additional electronically controlled brake system.

79. The system according to claim 70, wherein said warning is a tactile warning effected by adjustment to brake actuation energy in said vehicle train, said warning being a fading sensation representing vehicle train underbraking.

80. The system according to claim 61, further comprising means for at least one of disabling and enabling to only a limited extent external set braking requirements of said vehicle train including at least one of a distance control device, a traction control device, a drive slip control system and a speed control system if said ascertained temperature values of said wheel brakes reach said temperature limit value.

81. The system according to claim 61, further comprising means for limiting engine power and reducing engine torque in said vehicle train if said ascertained temperature values of said wheel brakes reach said temperature limit value.

82. The system according to claim 61, further comprising means for preventing excessive vehicle train speed if said ascertained temperatures of said wheel brakes reach said temperature limit value.

83. The system according to claim 82, wherein said means for preventing excessive vehicle train speed includes means for preventing upshifting of a transmission of said vehicle train.

84. The system according to claim 61, wherein said vehicle train includes at least one coupling force control system for matching deceleration of said at least one additional vehicle train part caused by said additional wheel brakes to deceleration of said first vehicle train part caused by said first wheel brakes so that at least one of a force of zero magnitude and a force of small magnitude is transmitted between said at least one additional vehicle train part and said first vehicle train part during vehicle train braking.

* * * * *